June 8, 1965 M. E. CRIFFIELD 3,188,047
SOLENOID ACTUATED PILOT VALVE
Filed April 2, 1962
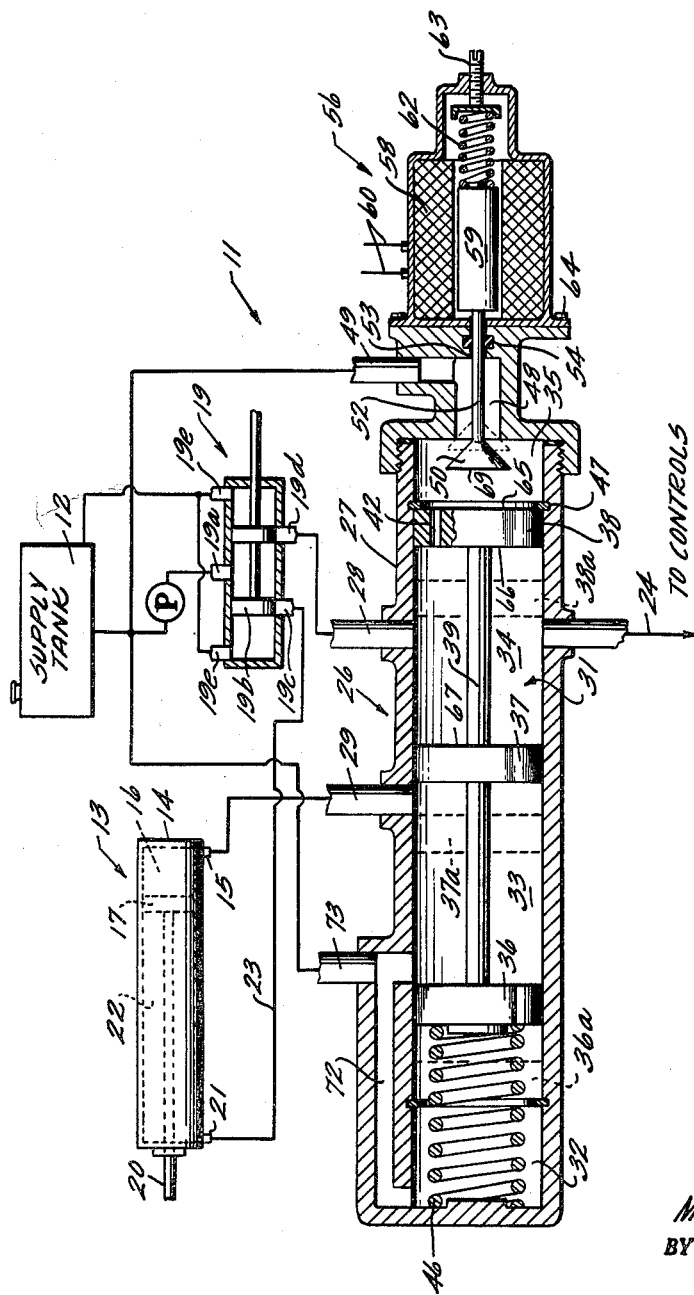
INVENTOR.
MELVIN E. CRIFFIELD
BY
Gerald L Moore
ATTORNEY

United States Patent Office 3,188,047
Patented June 8, 1965

3,188,047
SOLENOID ACTUATED PILOT VALVE
Melvin E. Criffield, Cincinnati, Ohio, assignor to General Electric Company, a corporation of New York
Filed Apr. 2, 1962, Ser. No. 184,356
1 Claim. (Cl. 251—30)

The present invention relates to a pilot valve and more particularly to a valve for the purpose of both controlling flow and regulating the minimum fluid pressure of a hydraulic system.

In hydraulic systems it is advantageous to control flow and pressure in a manner presenting as little risk of malfunction as possible while not overcomplicating the control system. However, in providing such control devices, it is usually necessary to employ two or more control means which not only complicate the control assembly but further complicate the actuating means therefor and the maintenance of the overall system. In addition, in controlling the flow it is necessary to insure a minimum fluid pressure in the hydraulic system to perform the functions required of the system, for instance in aircraft hydraulic systems where reliability is extremely important, it is necessary that the system pressure be maintained at a minimum to assure proper functioning of control systems and the like where a malfunction could render the overall apparatus, i.e., the aircraft inoperable.

Such is especially true in actuating a thrust reverser, variable area nozzles, etc. For instance, in aircraft thrust reverser actuation by hydro-mechanical means, it is necessary to assure that the reversers will not be actuated to the reverse thrust position when not desired and it is further necessary to see that actuation of the other systems dependent on the hydraulic supply is complete to the extent of performing the desired functions required. However, in the past, provision for such an interlock to assure this positive functioning could overly complicate the system to the point of affecting the reliability thereof, which naturally is undesirable.

It is therefore one object of this invention to provide a simplified fast-acting pilot valve which combines the functions of flow control and minimum pressure regulation of the hydraulic system, It is another object of this invention to provide such a pilot valve wherein the pressured fluid of the system provides the main actuating force for the valve, It is a further object of this invention to provide such a pilot valve utilizing a minimum of lands across which a pressure drop must be maintained.

Briefly, the invention comprises a pilot valve having a housing with an elongated cavity therein, first and second valve members positioned in said cavity capable of reciprocal movement in response to hydraulic pressures, a connecting link joining these members, a fluid inlet in the housing positioned between these members with fluid outlets on the opposite sides of the pistons from the inlet, with the first fluid outlet positioned to be completely closed by the first valve member and the second fluid outlet having a control valve for controlling flow therethrough, with the adjacent second valve member having an orifice therethrough wherein fluid introduced into said inlet will flow through said orifice and, when the control valve is closed, will thereafter cause said valve members to move in unison to cause the second valve member to open said outlet and allow fluid flow from the inlet out through the first fluid outlet.

Other objects and many of the attendant advantages of this invention will be readily appreciated as the same becomes better understood by reference to the following detailed description when considered in connection with the accompanying drawing wherein:

The single figure of the drawing illustrates the pivot valve with a hydraulic system in which such a valve is applicable illustrated in the schematic form.

Referring now to the drawing therein is generally illustrated a hydraulic system 11 comprising a hydraulic fluid supply tank 12 and pressure pump P with the hydraulic lines of the system illustrated schematically. The hydraulic system illustrates a representative system wherein the subject invention is applicable where it is desired to move the actuator 13 in a housing 14 by supplying pressured fluid into the inlet 15 which enters the cavity 16 within the housing. A piston 17 may reciprocate longitudinally within the housing 14 and thereby move the actuating rod 20. When the pressured fluid enters the chamber 16, it creates a force against the face of the piston 17 to move it in the direction away from the inlet 15, thereby actuating a mechanism such as a thrust reverser on an aircraft (not shown). An outlet 21 is provided to allow fluid to escape from the cavity 22 and to prevent the piston from becoming pressure locked. Hydraulic lines 23 returns the hydraulic fluid back through the main control valve 19 to the supply tank or pump. Further, by actuation of the four-way main control valve 19 to the other positions, fluid may be supplied to the inlet 21 and extracted from the inlet 15 to return the piston to its original position. This valve functions in the usual manner with fluid from the pump P passing in through inlet 19a then depending on the position of the piston assembly 19b, can pass out through either outlet 19c or 19d. If the fluid passes from outlet 19c, it passes through line 23 to inlet 21 to move piston 17 to the right. In this instance fluid from outlet 15 of the actuator 13 may pass through the line 29 and chamber 33 through port 73 back to the supply side of the pump P or to the tank 12.

With the control valve piston 19b moved to the right, fluid from inlet 19a passes out outlet 19d through line 28 to the pilot valve 26 and out line 29 upon movement of piston 37 to the left as will later be explained and into the actuator inlet 15. In this instance fluid is returned from the actuator port 21 through the port 19c to port 19e and back to the supply tank.

In such hydraulic systems it is frequently necessary to provide a pilot valve 26 in addition to the main control valve 19 to assure positive action of the system and to guard against accidental actuation. In assuring such positive action, the minimum pressure of the fluid within the hydraulic system must be regulated to assure positive functioning of other controls which might be actuated by the hydraulic system through such lines as line 24 as well as assuring positive actuation of the actuator 13. As a main controller of the actuator, the main control valve is provided which controls the primary flow from the pump. Even when closed, this valve may allow a small low pressure flow to the pilot valve as will be pointed out hereinafter. A pilot valve 26 is incorporated in the hydraulic line between the control valve and the actuator 13 to safeguard the system against unintentional actuation of this actuator.

This pilot valve 26 consists of a housing 27 having a main inlet 28 and a main outlet 29 for exiting hydraulic fluid to the actuator 13. A cavity 31 is provided within the housing 27 which is divided into a spring cavity 32, a third fluid cavity 33, first fluid cavity 34 and a second fluid cavity 35 by valve members or pistons 36, 37 and 38 which are connected by the connecting link 39 for unified movement. The valves or pistons are also cylindrically shaped or have an outside circumference which interfits with the walls of cavity 31 to allow reciprocal movement of the pistons longitudinally within the cavity 31 and yet seal against fluid passage between the pistons and the cavity walls. As the fluid is allowed to enter the main inlet 28 by proper actuation of the main control valve 19, it flows into the first cavity 34 and the direction of flow is thereafter controlled by the position of the valve or piston 37, i.e., when it is in the position illustrated the fluid cannot flow out the main outlet 29 to the actuator 13 however when the valve 37 is actuated to the dotted position 37a, the fluid may pass from the main inlet 28 through the first cavity 34 and out the main outlet 29 to the actuator 13.

To control the position of the valve 37, the valve 38 attached by the connecting link 39 is provided with an orifice 42. Ordinarily, the pistons are in the positions illustrated due to the force of a spring 46 acting against the valve 36 also forcing valves 37 and 38 to the right and against the stop 47 located in a groove in the internal cavity 31 of the pilot valve. With the pistons in this position the fluid may enter the main inlet 28, pass through the first cavity 34 through the orifice 42 and into the second cavity 35. Connecting with the second cavity 35 is a secondary outlet 48 with a hydraulic line 49 connected thereto and extending back to the inlet of pump P. This minimum flow may be utilized to cool the system and also assure against clogging of the lines by maintaining a minimum continuous flow therethrough. Controlling flow through the secondary orifice 48 is a valve 50 preferably consisting of a cone-shaped member to close the orifice 48, with a rod 52 connected for actuating or controlling the position of this valve 50. The control rod 52 extends out through an opening 53 which is suitably sealed against fluid leakage around the rod by seal member 54. A solenoid 56 is provided to move the rod 52 and the valve 50, this solenoid operates in the usual well known manner of employing an electromagnet force on the control rod 52. Solenoid 56 consists of a coil 58 with an iron core 59 which by proper energization of the coil 58 through the connectors 60 sets up a magnetic field around the coil and through the core 59 which tends to move the core 59 to the right against the action of a spring 62 thereby causing the control rod 52 and valve 50 to move to the right to close the secondary outlet 48. A set screw 63 is provided to control the positioning of the core and therefore the positioning of the valve member 50 so that it is properly closed and opened by the solenoid and spring. The solenoid is attached to the end of the pilot valve by means of screws 64 for ease of maintenance and replaceability.

In operation, with the pilot valve positioned as illustrated in the drawing and the pump will operate to effect a minimum hydraulic fluid flow through the main inlet 28 into the first chamber 34, through the orifice 42 and the secondary outlet 48 back through the hydraulic line 49 for cooling, etc. When it is desired to actuate the actuator 13 to the left, the main control valve 19 is operated to permit high pressured flow to the inlet 28, and solenoid 56 is energized by applying an electrical potential across the electrical conductors 60. This energization may be tied in with the actuation of the main control valve 19 or may be controlled by some other control element in the hydraulic or aircraft system to provide additional safeguards against unintentional actuation of the actuator 13. At this time the iron core 59 moves to the right moving the actuator rod 52 and the valve 50 to the right to close the secondary outlet 48. Pressure fluid continues to pass through the orifice 42 into the second cavity 35 and thereafter as the valve 50 starts to close assists the closing of this valve since the pressure drop through the secondary outlet 48 increases as the flow area decreases which serves to increase the fluid force tending to close the valve 50. This fluid action both decreases the actuating force necessary for the closing of the valve 50 and increases the speed of closing the valve. With the secondary outlet 48 closed, the pressure of the fluid builds up within the second cavity 35 and to effect a force on the face 65 of the piston 38 tending to move the piston to the left. Naturally, there also is a force exerted on the face 66 of this piston however this is balanced by an equal and opposite force exerted on the face 67 of the piston 37 therefore the net effect of this fluid force is that exerted on the face 65. Depending upon the force exerted by the spring 46 tending to oppose this movement of valve 38 to the left, there is determined a minimum fluid pressure which will move the valve assembly to the left. When and if the pressure in the second cavity 35 and therefore the pressure in the hydraulic system between the control valve and this valve, reaches this pressure, the piston 38 will move to the left taking with it pistons 36 and 37 of the valve assembly. It therefore takes three conditions for the system to be actuated to the point of causing the actuator 13 to move actuation of the control valve 19, closing of the valve 50 and a minimum fluid pressure in the pilot valve 26 to actuate the valves 36, 37 and 38.

When piston 37 passes to the left of the main outlet 29, fluid is allowed to flow from the main inlet 28 through the first cavity 34 and out through the main outlet 29 to pass through the hydraulic line to the actuator inlet 15 and on into the cavity 16 to thereafter exert a force on the piston 17 and cause the actuator to move to the left in the drawing. So long as the fluid pressure maintains that minimum pressure necessary to compress the spring 46, the valves will remain in this position while the control valve 50 is closed. By proper sizing of the spring 46 the pilot valve 26 may be caused to act as a pressure regulator since it will remain open so long as the pressure is maintained at that minimum pressure predetermined by the spring size thereby assuring a minimum pressure within the hydraulic system. Further, this regulation of the minimum pressure does not cause a pressure drop in the pilot valve 26 once the minimum pressure is reached since the valve 37 moves past the main outlet 29 to allow free flow from the main inlet 28. As pointed out before, this minimum pressure regulation assures proper operation of the system. Further, by proper sizing of the valve face 69 of the valve member 50, this valve may be held closed even after de-energization of the solenoid 56 by the fluid force exerted on the valve face 69 in the cavity 35 due to the pressure drop across this valve.

To prevent vacuum locking of the piston 36, the passage 72 is provided which equalizes the fluid pressures on either side of the piston and connects with the connecting secondary outlet 73 to a hydraulic line to carry any fluid back therein to the pump inlet or supply if need be. In this manner any leakage past the piston 37 is directed back through the hydraulic system.

It may be seen that the present invention provides a combination pilot valve and pressure regulator which may be actuated by a relatively small signal to the control solenoid but which is powered by the hydraulic fluid under pressure in the system thereby negating the need for any powerful actuators or other actuating means. Further, the invention provides a pilot valve which allows a limited flow for cooling thereby preventing the system from clogging, regulates the minimum pressure of the system and further positively protects the system from inadvertent actuation.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed as new and desired to be secured by Letters Patent of the United States is:

A valve comprising,
 a housing having an elongated cavity therein,
 first and second pistons slidably positioned in said cavity dividing said elongated cavity into first, second, and third cavities,
 a connecting member joining said first and second pistons, a first spring normally biasing said pistons to a first position,
a fluid inlet in said housing opening into said first cavity between said pistons,
a first fluid outlet in said housing leading to said third cavity but positioned such that by movement of said pistons said outlet connects with said first cavity,
an orifice through said first piston allowing fluid flow between said first and second cavities,
a second fluid outlet in said housing leading from said second cavity having a fluid flow area larger than said orifice,
a control valve means in said second fluid outlet,
a second spring for maintaining said control valve means in a normally opened position,
said control valve means having a surface larger than said second fluid outlet and exposed to the fluid in said second cavity so as to be hydraulically assisted during closing, and
a solenoid to actuate said control valve means,
whereby pressured fluid entering said fluid inlet in said first cavity will pass through said orifice and flow out through said second fluid outlet until said solenoid starts to close said control valve means at which time said fluid pressure within said second cavity will assist in closing said control valve means and move said pistons from said first position to connect said first fluid outlet with said first cavity to allow fluid flow from said fluid inlet to said first fluid outlet and said first spring returns said pistons to said first position when said solenoid reopens said control valve means, thereby disconnecting said first fluid outlet from said first cavity.

References Cited by the Examiner
UNITED STATES PATENTS

| | | | |
|---|---|---|---|
| 926,389 | 6/09 | Collin | 251—30 XR |
| 2,713,989 | 7/55 | Bryant | 251—324 |
| 2,722,234 | 11/55 | Macgeorge | 251—33 XR |
| 2,843,092 | 7/58 | De Groff | 137—625.6 |
| 2,889,132 | 6/59 | Reynolds | 251—33 |

M. CARY NELSON, *Primary Examiner.*

LAVERNE D. GEIGER, *Examiner.*